(12) United States Patent
Lai et al.

(10) Patent No.: US 6,171,349 B1
(45) Date of Patent: *Jan. 9, 2001

(54) REACTIVE DYE COMPOSITION

(75) Inventors: Bao-Kun Lai; Der-Chin Song, both of Tau-Yuan Hsien (TW)

(73) Assignee: Everlight USA, Inc., Pineville, NC (US)

( * ) Notice: Under 35 U.S.C. 154(b), the term of this patent shall be extended for 0 days.

This patent is subject to a terminal disclaimer.

(21) Appl. No.: 09/346,731

(22) Filed: Jul. 2, 1999

Related U.S. Application Data

(63) Continuation-in-part of application No. 09/233,455, filed on Jan. 20, 1999, now Pat. No. 6,126,700.

(51) Int. Cl.$^7$ .............................. C09B 67/24; C09B 67/22
(52) U.S. Cl. ...................................... 8/549; 8/641
(58) Field of Search ........................................ 8/549, 641

(56) References Cited

U.S. PATENT DOCUMENTS

| | | | |
|---|---|---|---|
| 5,445,654 | * | 8/1995 | Hussong et al. . |
| 5,611,821 | * | 3/1997 | Huang et al. . |
| 5,690,698 | * | 11/1997 | Von Der Eltz et al. . |
| 5,779,739 | * | 7/1998 | Von Der Eltz et al. . |
| 5,931,974 | * | 8/1999 | Pedemonte . |

FOREIGN PATENT DOCUMENTS

| | | | |
|---|---|---|---|
| 7-278461 | * | 10/1995 | (JP) . |
| 9-169922 | * | 6/1997 | (JP) . |

\* cited by examiner

*Primary Examiner*—Margaret Einsmann
(74) *Attorney, Agent, or Firm*—Bacon & Thomas

(57) ABSTRACT

A reactive dye composition comprising (a) at least a black or navy reactive dye with good color fastness to laundering-oxidative bleach response; and (b) at least a red, orange, yellow or other shade of reactive azo dye. The dye composition of the present invention is suitable for use in dyeing fiber materials. It has good property in build-up, wash fastness, wash-off, and levelness, especially performing excellently in the properties of good color fastness to laundering-oxidative bleach response.

14 Claims, No Drawings

REACTIVE DYE COMPOSITION

This application is a continuation-in-part application of pending U.S. application Ser. No. 09/233,455 filed Jan. 20, 1999, now U.S. Pat. No. 6,126,700.

FIELD OF THE INVENTION

The present invention relates to a reactive dye composition, in particular relates to a black or navy reactive dye composition suitable for use in dyeing fiber materials. It has good property in color fastness to laundering-oxidative bleach response.

BACKGROUND OF THE INVENTION

So far, it is difficult to find a single reactive dye which can produce a highblack shade build up property. In order to get a high black shade build up property, a reactive dye composition which contains a plurality of reactive dye components has been used. Usually, one black or navy reactive dye (for example, the following formula (I) black reactive dye) as the major component

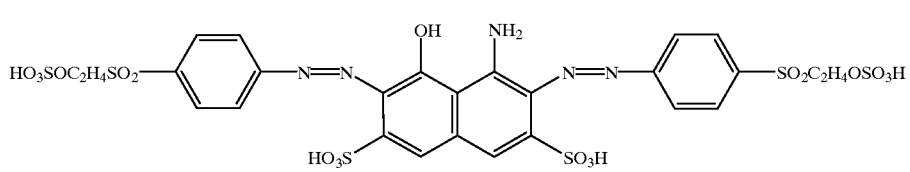

(I)

is mixed with red, orange, yellow or other shade reactive dye components to get the black reactive dye composition.

Black reactive dye compositions are already known from Japanese Patent Laid-open No. 58-160362, 63-178170, 1-315469, 2-73870, 2-202956, 8-104822, 8-253697, U.S. Pat. No. 5,445,654 and U.S. Pat. No. 5,611,821.

Due to strict requirements in energy saving and environmental regulations, advanced washing machines and highly efficient detergent have been continuously developed. The use of highly efficient detergent greatly improves the cleanness of washed materials. However, washed materials fade soon after several washings. This problem becomes worse if washed materials were dyed by the reactive black dye composition based on the major component of formula (I) black reactive dye. Therefore, there is a strong demand for a reactive black or navy dye composition having good property in color fastness to laundering-oxidative bleach response and wash fastness.

A reactive black or navy dye composition which is comprised of the above formula (I) black reactive dye as the major component and mixed with a plurality of reactive azo dyes fades soon after several washings. The reason is the poor property of the reactive black dye composition in color fastness to laundering-oxidative bleach response. Therefore, washed materials are caused to fade by the bleaching agent present during washing.

If the additional dye components of the dye composition have different color fastness to laundering-oxidative bleach response, the washed material may be caused to fade, and to change its hue as well. The current commercially available black dye compositions commonly have this drawback. Because the formula (I) black reactive dye used in current commercially available black dye compositions has poor property in color fastness to laundering-oxidative bleach response, the hue of the washed material will be caused to change after washing several times if the mixed red, orange, yellow, or other shade of reactive dye components have a better fastness to oxidative bleach, causing the washed black or navy material to change to brown, or some other hue.

In order to eliminate the aforesaid problem, there is a suggestion to select red, orange, yellow, or other shades of reactive dye components having the property of color fastness to laundering-oxidative bleach response approximately equal to the formula (I) black reactive dye. A black dye composition prepared according to this method may eliminate the change of hue, however it cannot prevent the washed material from being caused to fade by the bleaching agent.

SUMMARY OF THE INVENTION

It is one object of the present invention to provide a reactive dye composition that is suitable for use in exhausting, printing, or continuous dyeing of fiber materials, to provide good dying property. It is another object of the present invention to provide a reactive dye composition that has good property in build-up, wash fastness, wash-off, levelness and color fastness to laundering-oxidative bleach response.

The black or navy dye composition of the present invention is comprised of: (a) at least a black or navy reactive dye with good color fastness to laundering-oxidative bleach response; and (b) at least a red, orange, yellow or other shade of reactive azo dye. The reactive dye composition of the present invention may further comprise (c) a black reactive dye of the following formula (I).

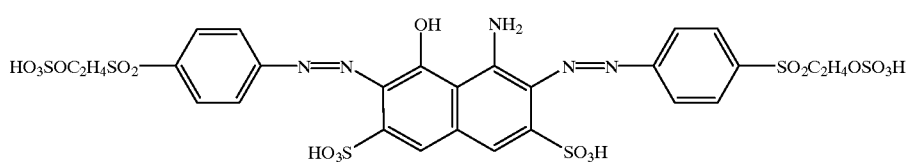

(I)

In order to improve the characteristics of the reactive dye composition, a black or navy reactive dye of good property in wash fastness and color fastness to laundering-oxidative bleach response is added. This composition effectively eliminates materials from changing -n hue, or fading due to the effect of a bleaching agent.

DESCRIPTION OF THE PREFERRED EMBODIMENTS

A black or navy dye composition in accordance with the present invention is generally comprised of (a) at least a black or navy reactive dye with a good color fastness to laundering-oxidative bleach response and wash fastness, (b) at least a red, orange, yellow or other shade of reactive azo dye. If it is necessary the reactive dye composition of the present invention can further comprise component (c) a black reactive dye of the following formula (I).

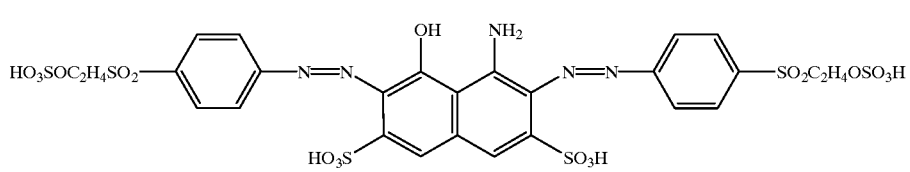

(I)

There is no special limitation on the black or navy reactive dye of component (a). Any black or navy reactive dye of good property in wash fastness and color fastness to laundering-oxidative bleach response that is compatible to the black reactive dye of formula (I) in dyeing properties, fixation, and dying affinity, can be used.

Preferably, the black or navy reactive dye of component (a) is a compound having the following formula (II)

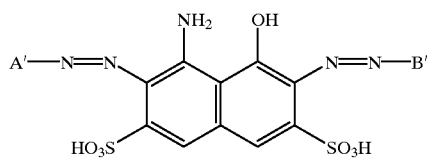

(II)

wherein A' and B', each independent, is an aromatic group which is non-substituted or substituted by halogen, $C_1$–$C_4$ alkyl, $C_1$–$C_4$ alkoxyl, sulfonyl, or amino groups, except reactive groups. The compound of formula (II) and tare black reactive dye of formula (I) have similar structure. Both of them are reactive dyes, containing 1-amino-8-hydroxynaphthyl-3,6-disulfonic acid derivative structure, and the compound of formula (II) have some substituted.

Examples of formula (II) are:

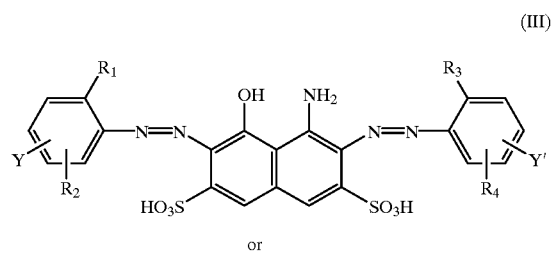

(III)

or

-continued

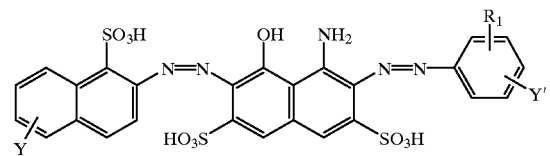

(IV)

wherein Y and Y', each independent, is —$SO_2X$, —NH—W,

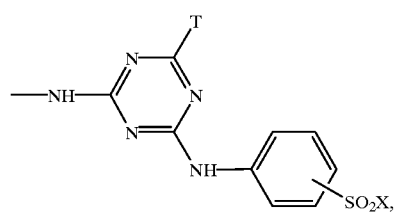

-continued
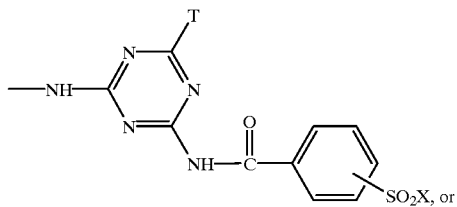
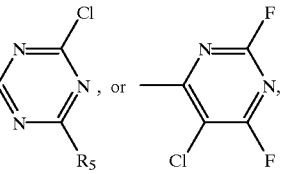
wherein W is
X is —OH, —CH═CH$_2$, —C$_2$H$_4$OSO$_3$H, or —C$_2$H$_4$Cl, T is —NHCN, —F, or —Cl, P is hydrogen, halogen, C$_1$–C$_4$ alkyl, or C$_1$–C$_4$ alkoxyl, R$_5$ is —Cl or C$_1$–C$_4$ alkoxyl, R$_1$, R$_2$, R$_3$ and R$_4$, each independent, is hydrogen, halogen, hydroxy, C$_1$–C$_4$ alkyl, C$_1$–C$_4$ alkoxyl, or sulfonyl groups.
More preferably examples of formula (III) and formula (IV) are:
(III-1)
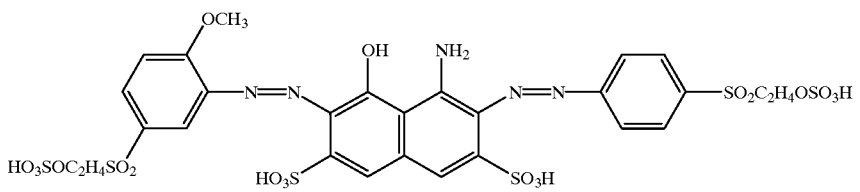
(III-2)
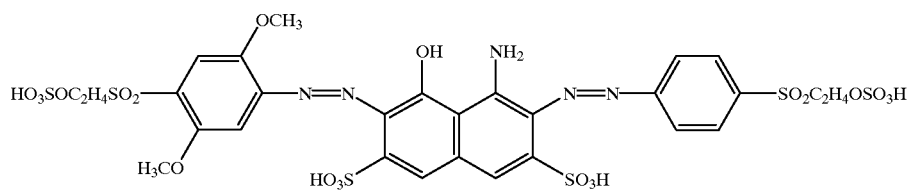
(III-3)
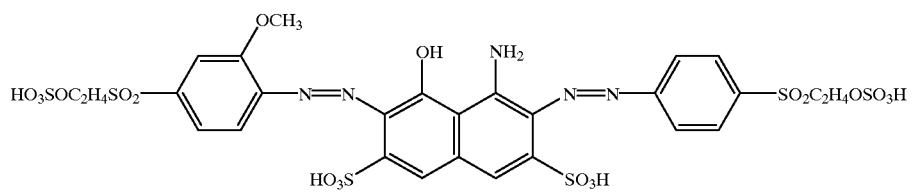
(III-4)
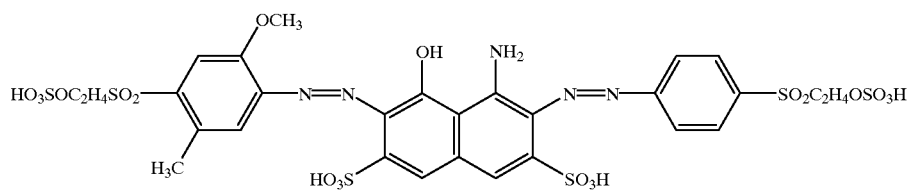
(III-5)
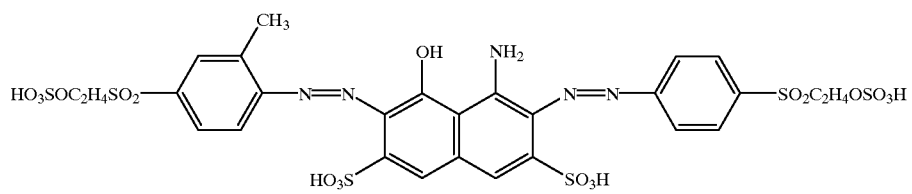

-continued
(III-6)
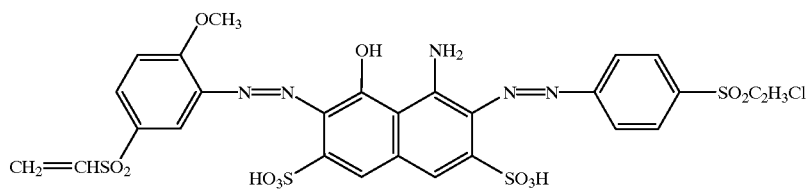
(III-7)
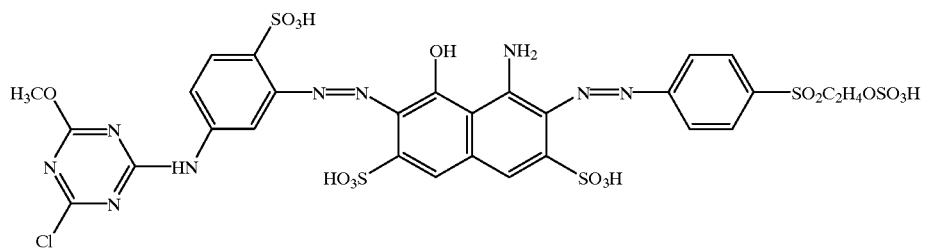
(III-8)
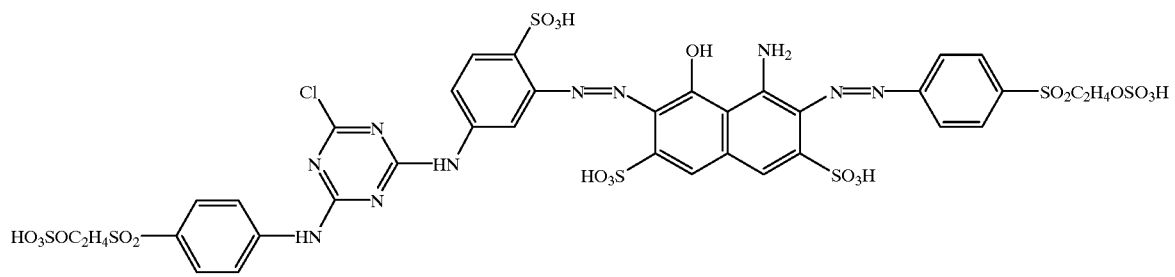
(III-9)
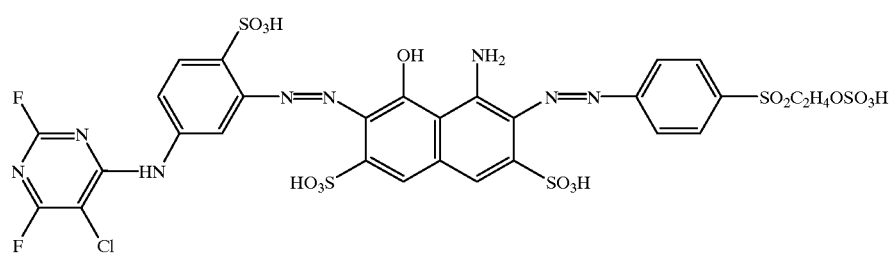
(III-10)
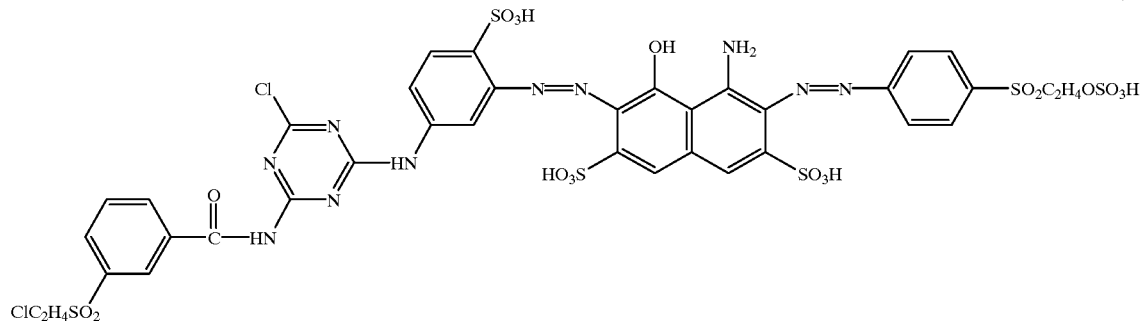
(III-11)
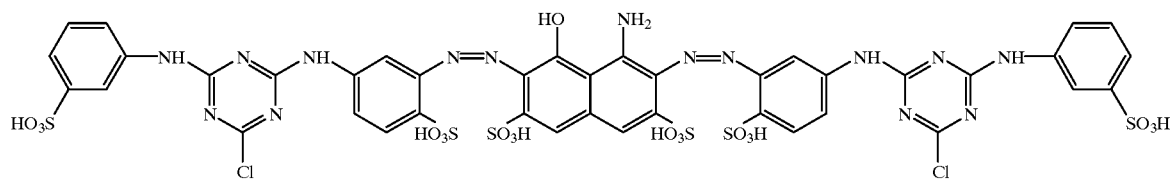

-continued
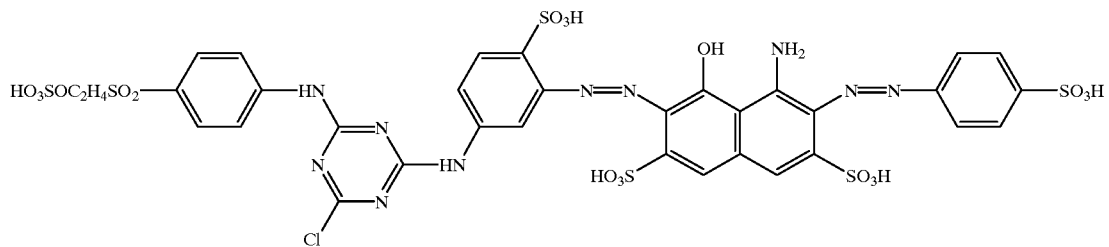
(III-12)
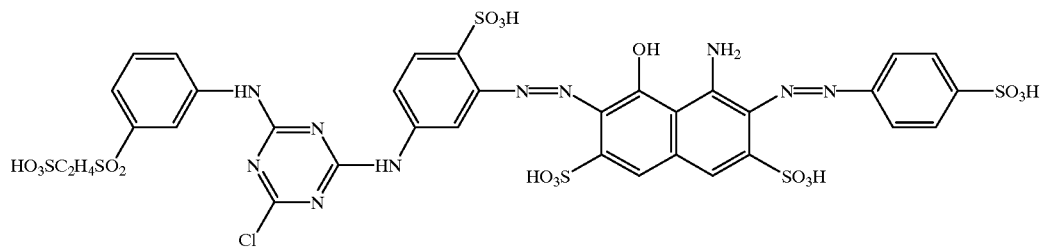
(III-13)
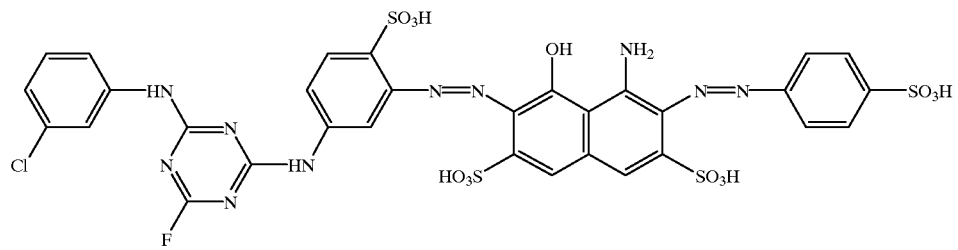
(III-14)
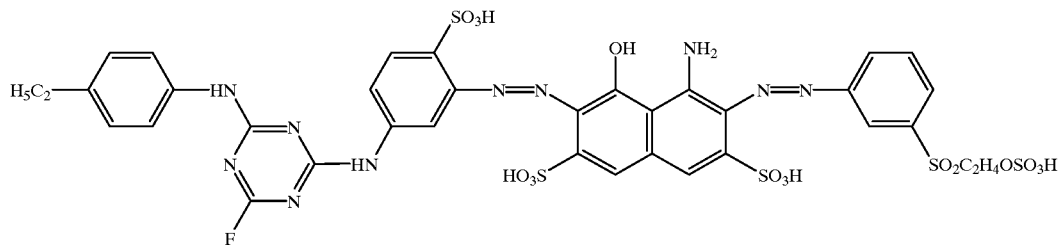
(III-15)
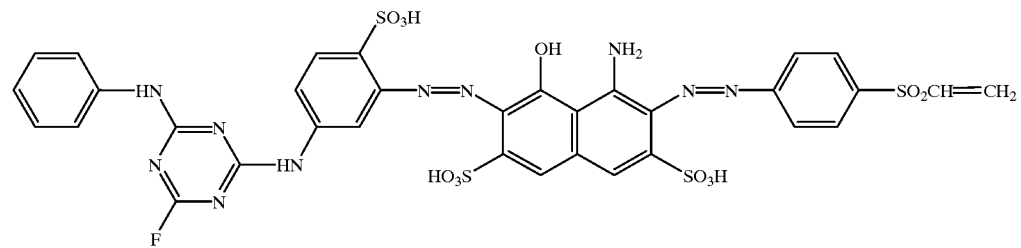
(III-16)
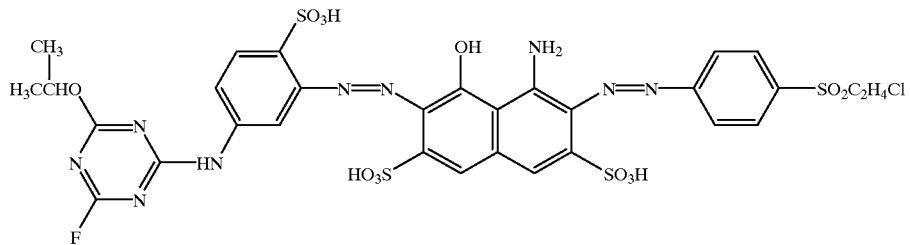
(III-17)

-continued
(III-18)
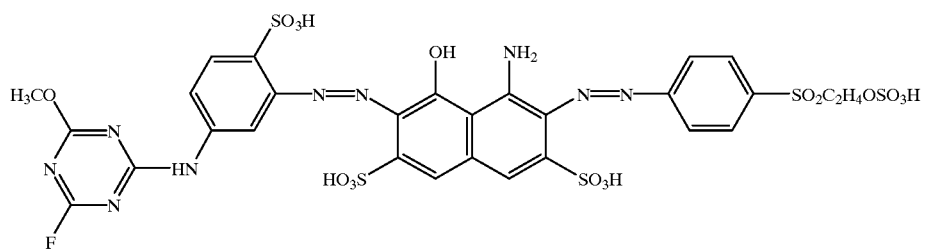
(III-19)
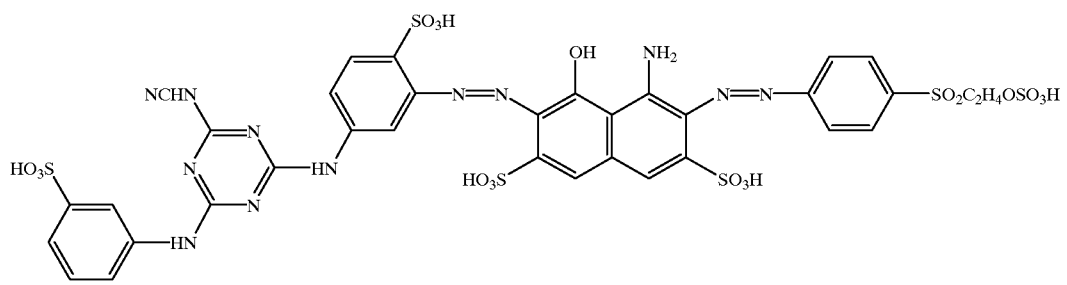
(IV-1)
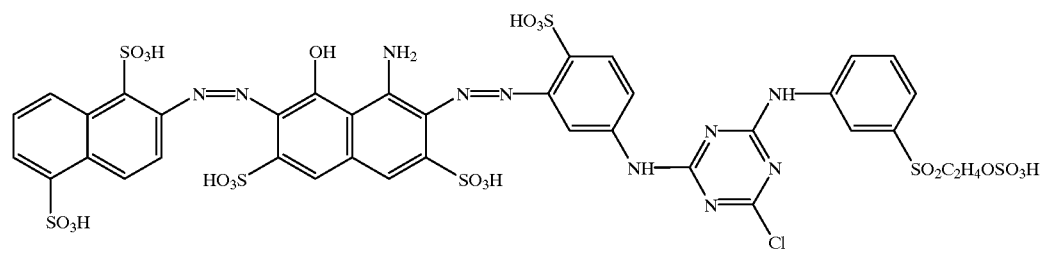
(IV-2)
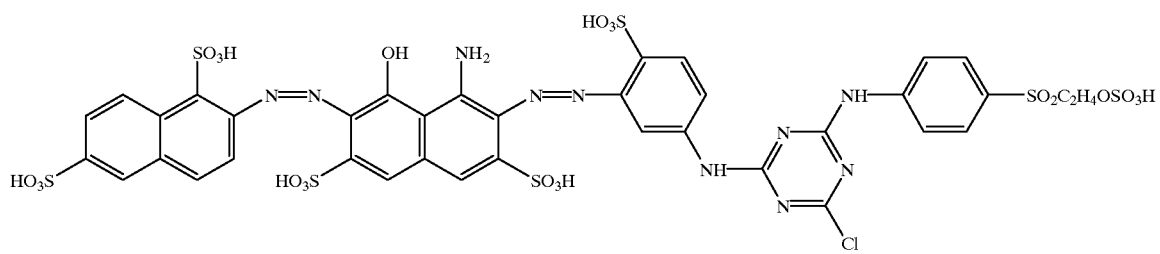
(IV-3)
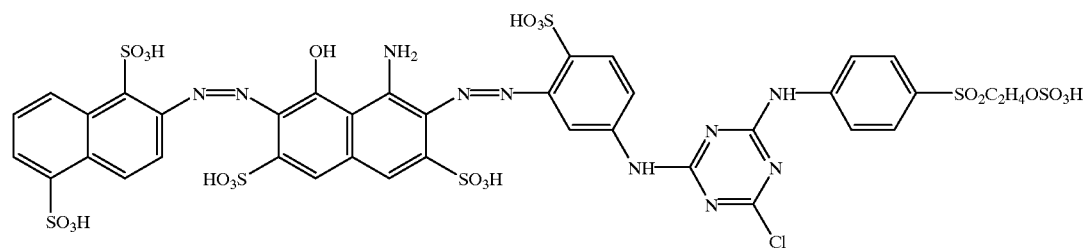
(IV-4)
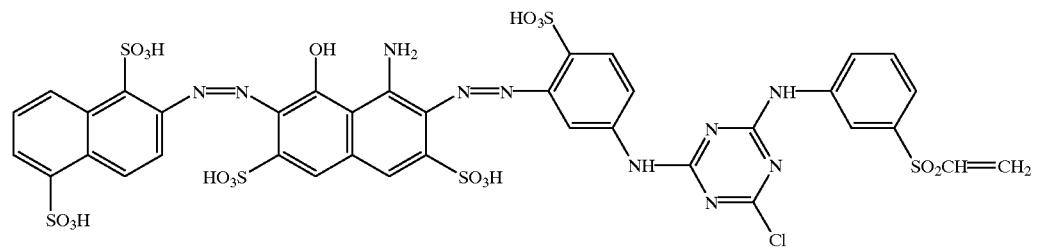

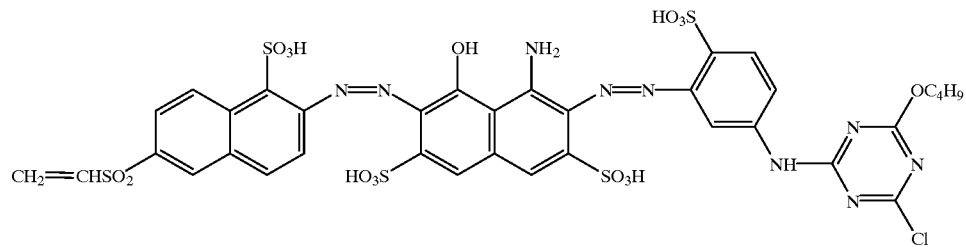

(IV-5)

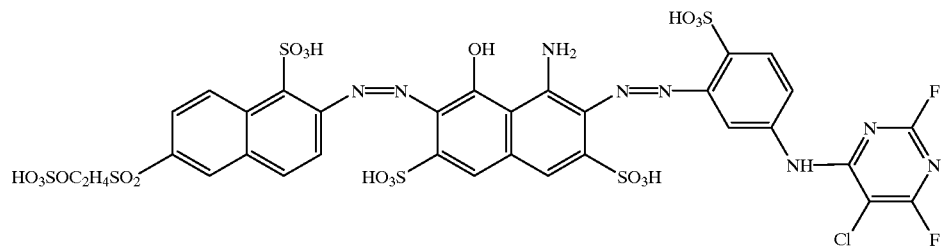

(IV-6)

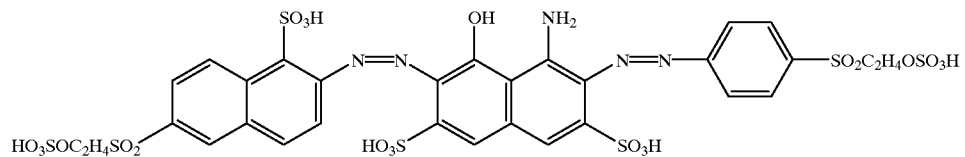

(IV-7)

There is no special limitation on the red, orange, yellow or other shade of reactive azo dye of component (b). Any red, orange, yellow or other shade of reactive azo dye of good property in build-up dyeing that is compatible to component (c) the black reactive dye of the formula (I) in dyeing properties, fixation and dying affinity, can be used.

Preferably, the examples of red, orange, yellow or other shade of reactive azo dye of component (b) are:

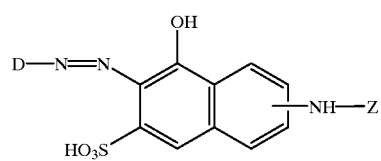

(V)

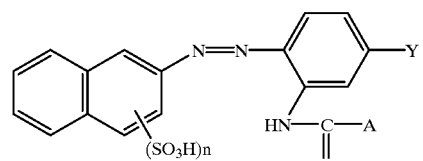

(VI)

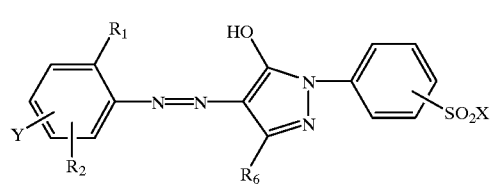

(VII)

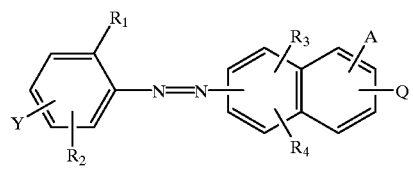

(VIII)

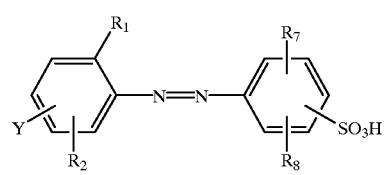

(IX)

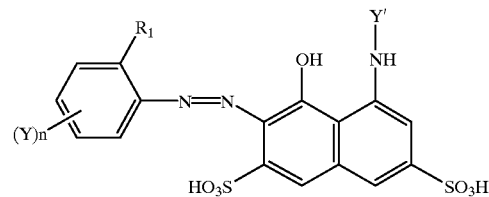

(X)

-continued
(XI)
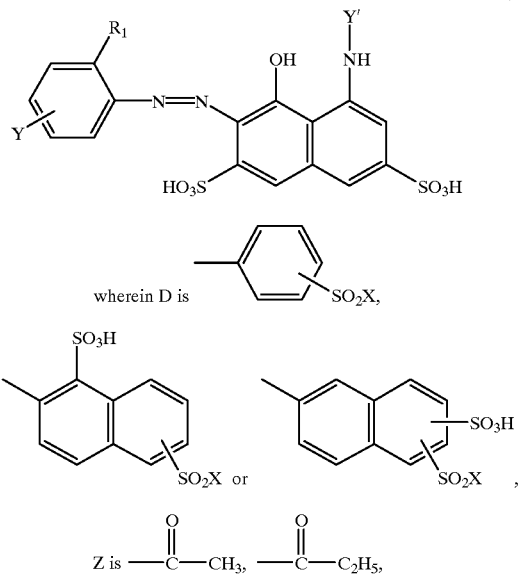
wherein D is
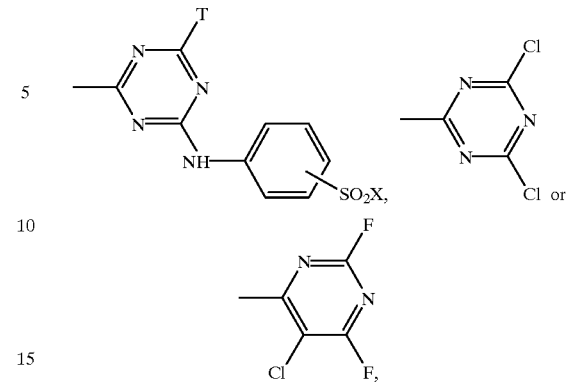
Z is
A is —OH, —NH$_2$ or —CH$_3$, R$_6$ is —CO$_2$H, —NH$_2$ or —CH$_3$, Q is —CO$_2$H or —SO$_3$H, R$_7$ and R$_8$, each independent, is hydrogen, C$_1$–C$_4$ alkyl, amino or amino derivatives, n is 0, 1, 2, or 3, wherein X, Y, Y', R$_1$, R$_2$, R$_3$, R$_4$ and T are defined as the above.
More specific examples of componenmt (b) are:
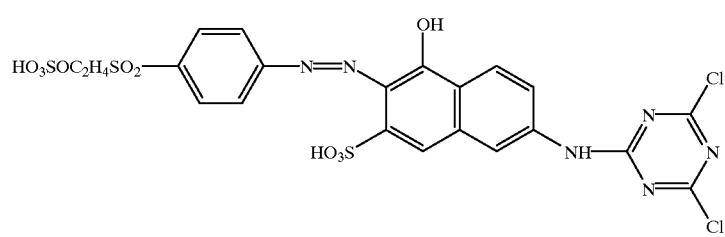
(V-1)
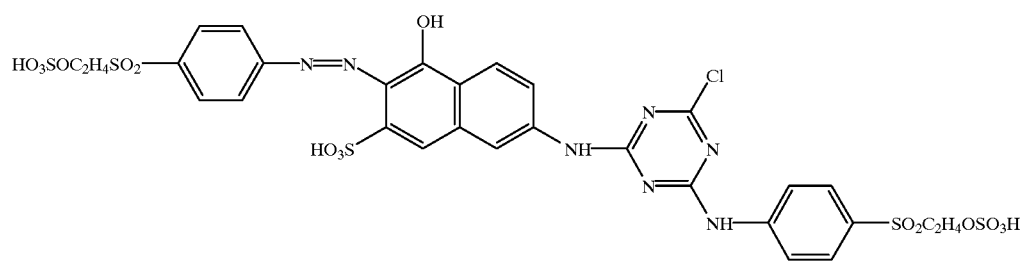
(V-2)
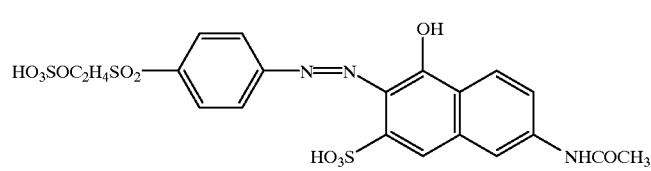
(V-3)

-continued
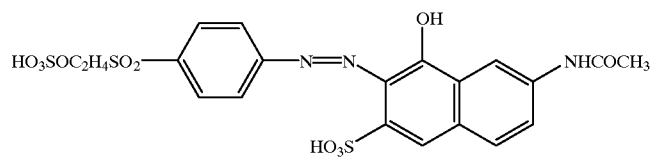
(V-4)
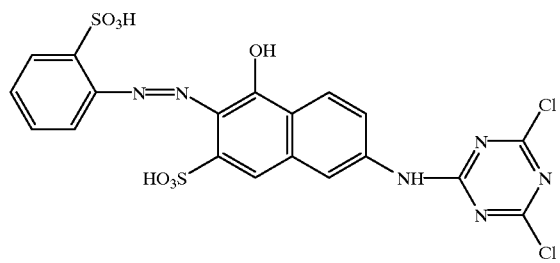
(V-5)
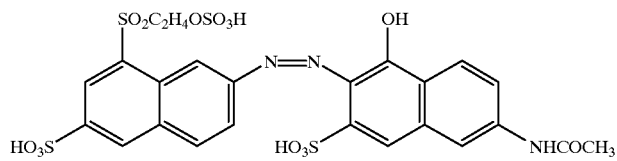
(V-6)
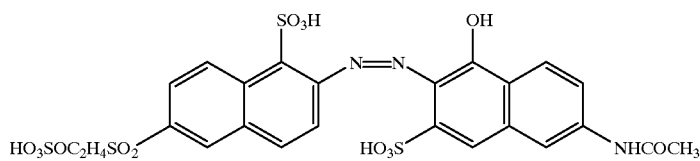
(V-7)
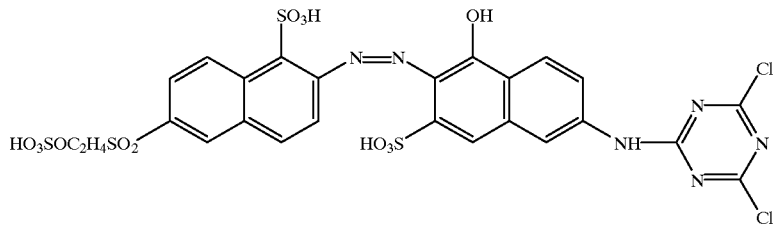
(V-8)
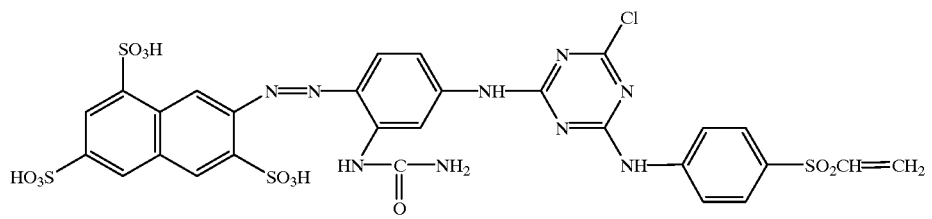
(VI-1)
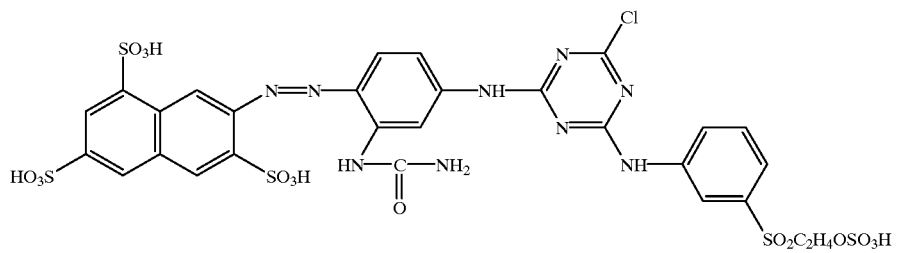
(VI-2)

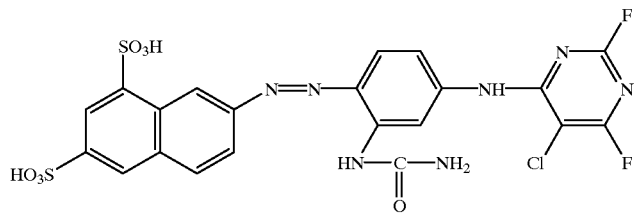 (VI-3)
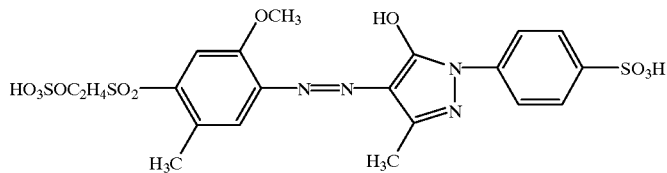 (VII-1)
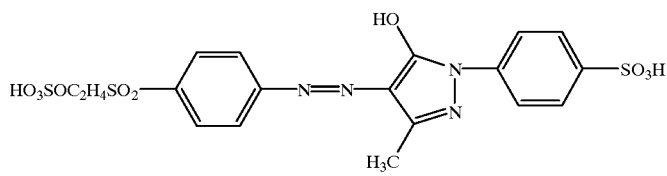 (VII-2)
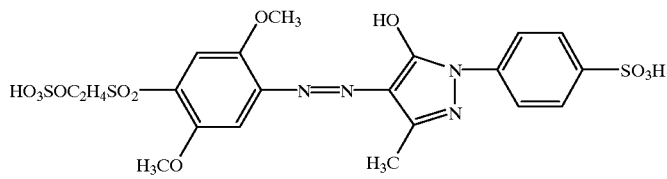 (VII-3)
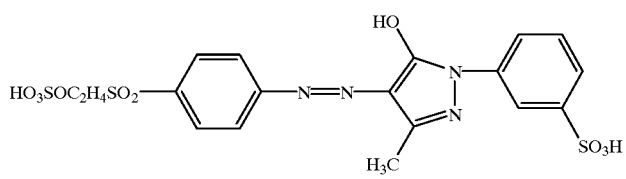 (VII-4)
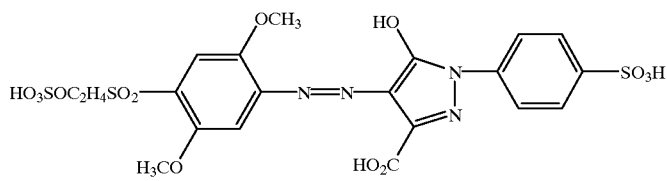 (VII-5)
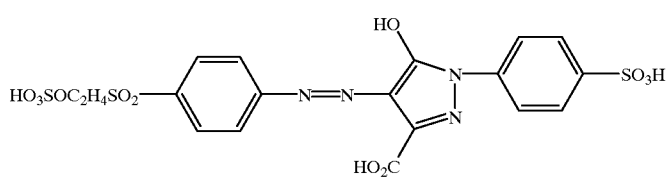 (VII-6)
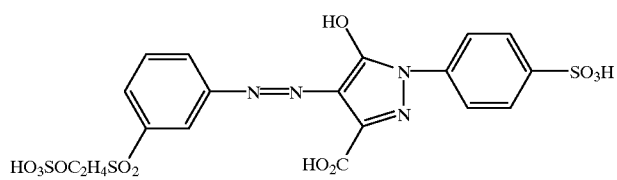 (VII-7)

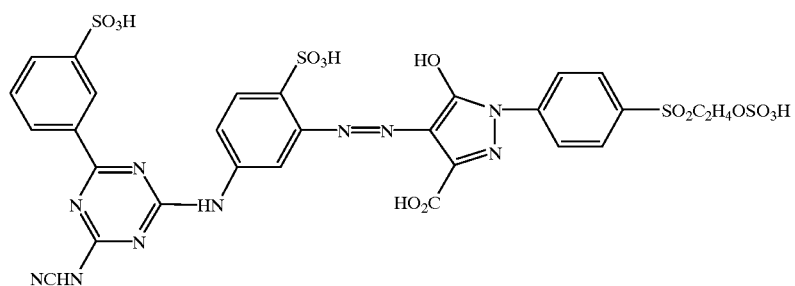
(VII-8)
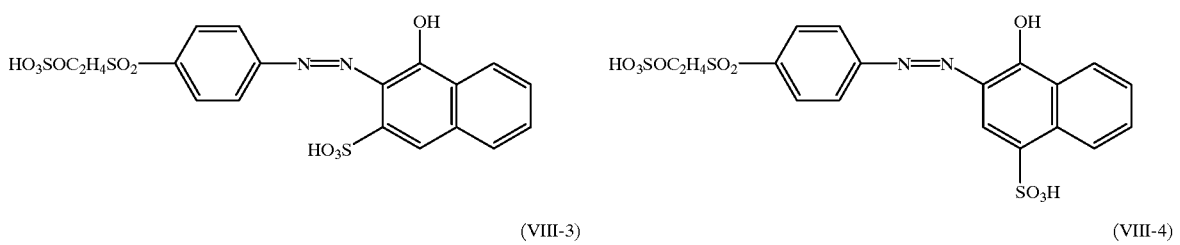
(VIII-1) (VIII-2)
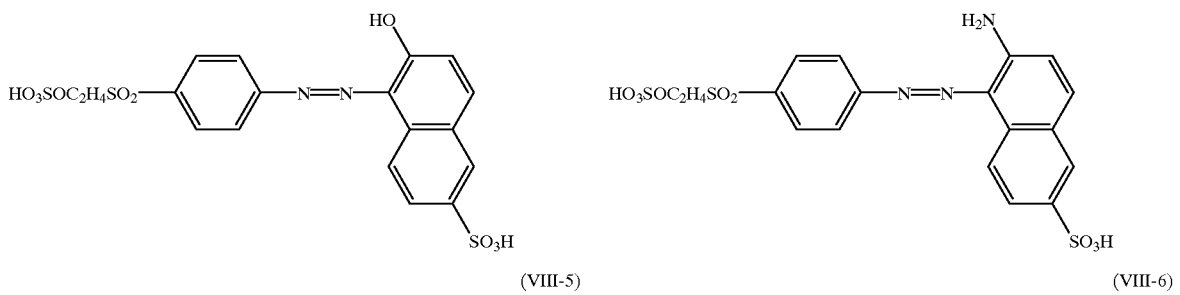
(VIII-3) (VIII-4)
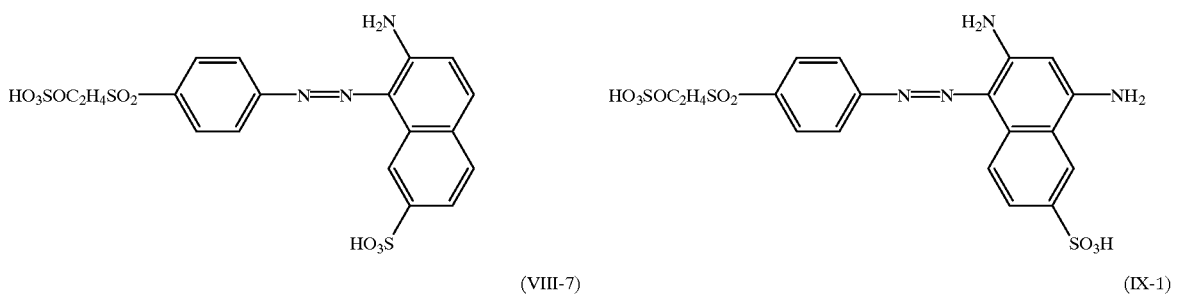
(VIII-5) (VIII-6)
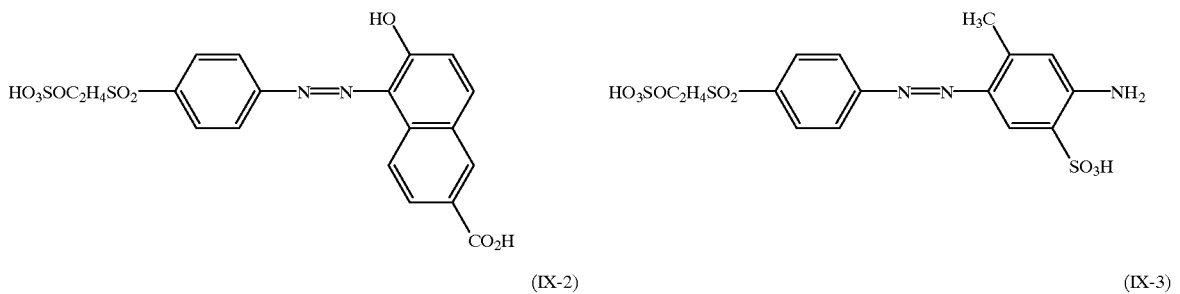
(VIII-7) (IX-1)
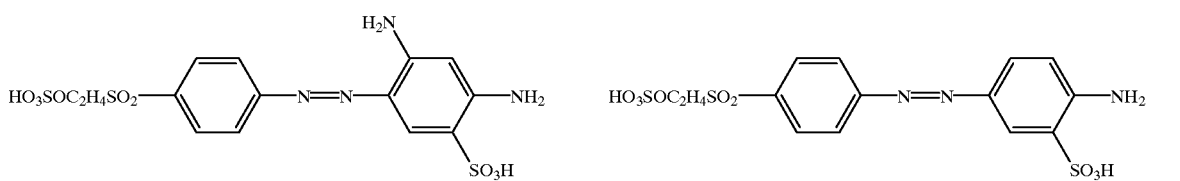
(IX-2) (IX-3)

-continued
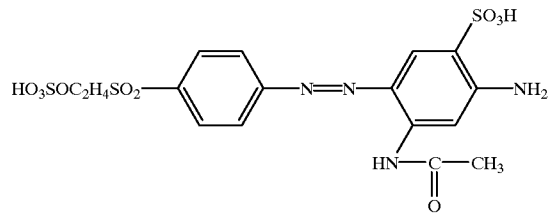
(IX-4)
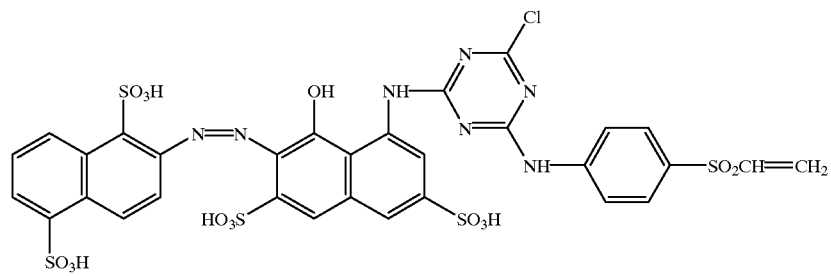
(X-1)
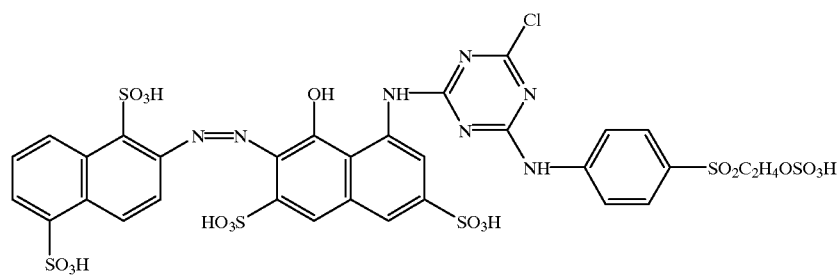
(X-2)
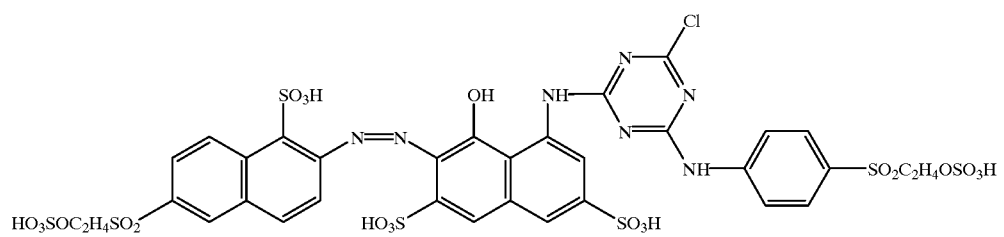
(X-3)
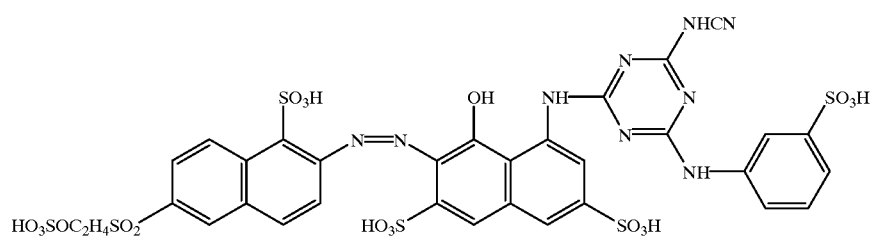
(X-4)
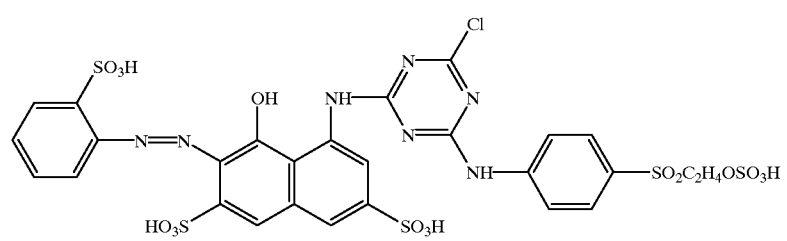
(XI-1)

-continued

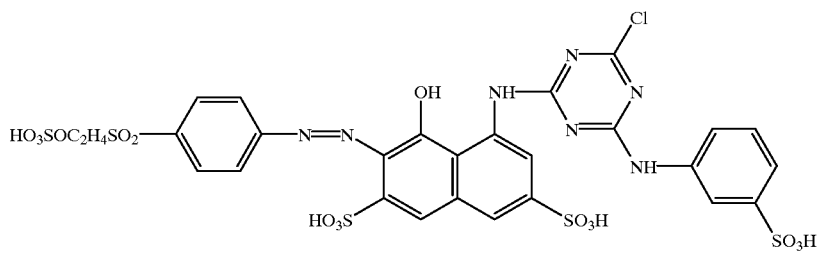
(XI-2)

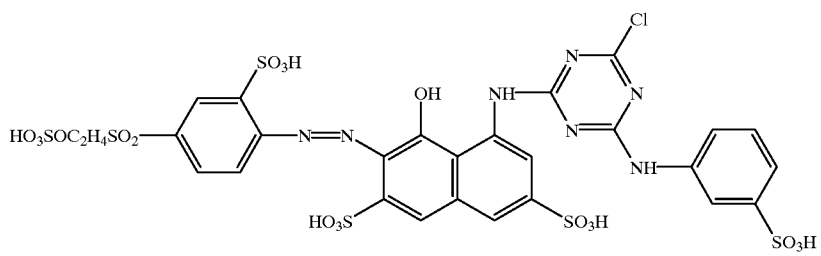
(XI-3)

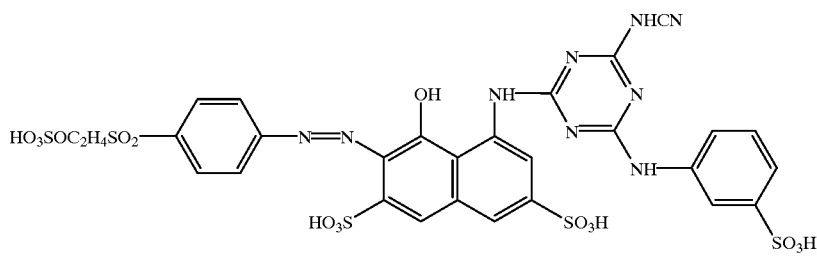
(XI-4)

The composition of the present invention can be prepared in many ways. For example, by using separately prepared dye components mixing each dye together, or, by mixing one component alone then with another component. The way of mixing is by using a proper mixer, for example, a ball and sand grinder. In the same way, individual dye with different components can make a dyeing liquid through stirring, or through control of conditions in each dye preparation to produce an ideal mixture. In the process of exhausting or printing, separate dyes can be mixed together or mixed with other dyes.

The dyestuff of the present invention can be in the form of powder, granular, particle, or liquid; and an auxiliary reagent, for example, a retarding agent, levelling agent, assistant agent, surfactant, or dispersing agent may be added.

The dyestuffs of the present invention all contain an anion group, such as a sulfonic acid group. For convenience in the statement, they are expressed as free acid in the specification. When the dyestuff of the present invention is manufactured, purified, or used, it often exists in the form of water soluble salt, especially an alkaline metallic salt, such as sodium salt, potassium salt or ammonium salt.

The ratio of each dye component can be changed in a wide range. In general, the minimum relative weight percentage for each dye component is 3%, and the maximum relative weight percentage is 90%.

The black dye composition of the present invention can be widely applied to dyeing a greater range of spinning and weaving products that contain a hydroxyl group or amide group, etc., such as wool, silk, polyamide, and natural or synthetic fiber; and also cellulose fiber like cotton, linen, artificial cotton, and artificial linen, etc. The dyeing method used is the one generally used when applying reactive dyestuff. Take the example of dyeing cellulose fiber. The dyed material will be applied on acid binding solution such as sodium hydroxide, sodium phosphonic, sodium carbonate or sodium bicarbonate before, during, and after dyeing, during which a required amount of auxiliary reagent will be used together with the additional parts.

For cellulose fiber, the black dye composition of the present invention is a dye composition of great industrial value. Dyed material with various good dyeing properties can be obtained, especially the properties of build-up, color fastness to laundering-oxidative bleach response, wash fastness, wash-off, and levelness.

Whether dyes have good color fastness to laundering-oxidative bleach response or not were determined by their color change value ($\Delta E$) and gray scale for assessing change of color rating. The color change was obtained and calculated through following procedures. A unmercerized cotton knitting was dyed with 3% on the weight of fiber. The dyed material was subsequently treated with the procedures described in British Standard BS 1006; UK-TO colour fastness to domestic laundering-oxidative bleach response, 1998. The color of the dyed material was measured by Macbeth, Color-Eye 3100. The color change $\Delta E$ was obtained through the calculation of the measured data according to colour formular CIE Lab and CMC (2:1). If the gray scale for assessing change of color rating of a dye is above 3–4 or the ΔE of a dye is less than 3 and on-toning fading appears, the dye is recognized as a dye with good color fastness to laundering-oxidative bleach response.

More detailed examples are used to illustrate the present invention, and these examples are used to explain the present invention. The examples below, which are given simply by way of illustration, must not be taken to limit the scope of the invention.

In these examples, the compound is represented by free acid, but its actual form can be metallic salt, or more possibly alkali salt, especially sodium salt, In these examples, parts is counted as weight, temperature is Celsius ° C.

EXAMPLE 1

Take formula (III-1) dye 86 parts and formula (VIII-2) dye 14 parts mixed together to get a homogeneous mixture. Then use the following procedure to carry out dye test and color fastness to laundering-oxidative bleach response test.

Dye testing:
a. Take the above dye composition two parts and completely dissolve in 100 parts distilled water to get dyeing solution.
b. Then take the dyeing bottle washed with distilled water and put dyeing solution 12 parts into the bottle. Finally add 6.4 parts Glauber's salt into the bottle.
c. Distilled water is added to the bottle to get total 80 parts.
d. Place eight parts unmercerized cotton knitting into the dyeing bottle.
e. The top of the bottle is covered with a lid and shaken to get homogeneous dye.
f. Put dyeing bottle into a thermobath at 60° C. and shake for 20 minutes. Then add 320 g/l pure base 7.5 parts to the bottle and keep at the same temperature for 90 minutes. The fabric is taken out and washed with cold water, then put into a big stainless bucket and washed with hot water for 10 minutes. Then put fabric into another big stainless bucket with 2.0 g/l soaping agent, and wash with boiling water for another 10 minutes.
g. The fabric is taken out, washed with cold water, then dried.

Color fastness to laundering-oxidative bleach response test: (References: BS 1006 ;UK-TO color fastness to domestic laundering-oxidative bleach response, 1998)
a. Put the dried test cloth obtained from dye testing in an incubator under relative humidity 65% and temperature 20° C. to for 4 hours, then take 10×5 cm$^2$ of the cloth for test.
b. Prepare a test solution by dissolving 10 g ECE soap that contains no phosphorus, 12 g sodium perborate, and 1.8 g TAED (tetra acetyl ethylenediamine) in 1,000 ml distilled water.
c. Take the test cloth and the test solution thus obtained, the bath ratio is 1:100 (cloth:solution), and put it in a 550 ml steel cylinder.
d. Close the steel cylinder, then put the steel cylinder in a wash fastness test machine under, the temperature from 30° C. raise to 60° C. by 2° C. /min, then under test temperature 60° C. for 30 minutes.
e. Remove the cloth from the steel cylinder after the test, then wash the cloth with clean water, and then dry the cloth.
f. Determination of test result: use Macbeth, Color-Eye 3100 to examine the color based on the color change (ΔE) of color formular CIE Lab and CMC (2:1) standards. The quality is acceptable when the gray scale for assessing change of color rating is higher than 3–4 degrees or ΔE<3, and on-tone fading appears. Those kinds of dye compositions can be described as "compositions having good property in color fastness to laundering-oxidative bleach response".

EXAMPLE 2 TO EXAMPLE 24

Take compositions of the following table (I-1) example and table (I-2) comparative example to repeat the dye test and the color fastness to laundering-oxidative bleach response test in example 1. The results were shown in table (II-1) and table (II-2).

TABLE (I-1)

| | component (a) | component (b) | | component (c) |
|---|---|---|---|---|
| | Compound ratio | Compound ratio | Compound ratio | Compound ratio |
| Example 2  | (III-1) 25% | (V-1) 16%   | —           | (I) 59% |
| Example 3  | (III-1) 27% | (V-1) 13%   | (VI-1) 6%   | (I) 54% |
| Example 4  | (III-1) 27% | (V-3) 18%   | —           | (I) 55% |
| Example 5  | (III-1) 27% | (V-3) 23%   | —           | (I) 50% |
| Example 6  | (III-1) 86% | (V-3) 7%    | (VIII-2) 7% | — |
| Example 7  | (III-1) 78% | (VI-1) 8%   | (X-1) 14%   | — |
| Example 8  | (III-1) 74% | (VI-1) 13%  | (XI-1) 13%  | — |
| Example 9  | (III-1) 74% | (VIII-2) 20%| (IX-2) 6%   | — |
| Example 10 | (III-1) 62% | (VIII-2) 25%| (IX-2) 13%  | — |
| Example 11 | (III-1) 24% | (VIII-2) 16%| (IX-2) 11%  | (I) 49% |
| Example 12 | (III-2) 27% | (V-1) 15%   | —           | (I) 58% |
| Example 13 | (III-2) 29% | (V-1) 12%   | (VI-1) 6%   | (I) 53% |
| Example 14 | (III-2) 29% | (V-3) 18%   | —           | (I) 53% |
| Example 15 | (III-2) 28% | (V-3) 23%   | —           | (I) 49% |
| Example 16 | (III-2) 88% | (V-3) 6%    | (VIII-2) 6% | — |
| Example 17 | (III-2) 79% | (VI-1) 13%  | (X-1) 8%    | — |
| Example 18 | (III-2) 75% | (VI-1) 12%  | (XI-1) 13%  | — |
| Example 19 | (III-2) 87% | (VIII-2) 13%| —           | — |
| Example 20 | (III-2) 75% | (VIII-2) 19%| (IX-2) 6%   | — |
| Example 21 | (III-2) 64% | (VIII-2) 24%| (IX-2) 12%  | — |
| Example 22 | (III-2) 25% | (VIII-2) 15%| (IX-2) 11%  | (I) 49% |
| Example 23 | (IV-1) 28%  | (V-1) 15%   | —           | (I) 57% |
| Example 24 | (IV-1) 30%  | (V-1) 12%   | (VI-I) 6%   | (I) 52% |
| Example 25 | (IV-1) 30%  | (V-3) 17%   | —           | (I) 53% |
| Example 26 | (IV-1) 29%  | (V-3) 22%   | —           | (I) 49% |
| Example 27 | (IV-1) 88%  | (V-3) 6%    | (VIII-2) 6% | — |
| Example 28 | (IV-1) 80%  | (VI-1) 12%  | (X-1) 8%    | — |
| Example 29 | (IV-1) 76%  | (VI-1) 12%  | (XI-1) 12%  | — |
| Example 30 | (IV-1) 65%  | (VIII-2) 23%| (IX-2) 12%  | — |
| Example 31 | (IV-1) 26%  | (VIII-2) 15%| (IX-2) 11%  | (I) 48% |

TABLE (II-1)

| | Grade | GIE Lab (ΔE) | CMC (2:1) (ΔE) | On-Tone Fading |
|---|---|---|---|---|
| Example 1  | 5   | 0.05 | 0.21 | Y |
| Example 2  | 3–4 | 2.89 | 2.49 | Y |
| Example 3  | 3–4 | 2.84 | 2.47 | Y |
| Example 4  | 3–4 | 2.85 | 2.32 | Y |
| Example 5  | 3–4 | 2.79 | 2.42 | Y |
| Example 6  | 4–5 | 0.63 | 0.46 | Y |
| Example 7  | 4–5 | 0.60 | 0.44 | Y |
| Example 8  | 4–5 | 0.79 | 0.58 | Y |
| Example 9  | 4–5 | 0.45 | 0.39 | Y |
| Example 10 | 5   | 0.35 | 0.52 | Y |
| Example 11 | 3–4 | 2.62 | 2.32 | Y |
| Example 12 | 3–4 | 2.79 | 2.24 | Y |
| Example 13 | 3–4 | 2.61 | 2.31 | Y |
| Example 14 | 3–4 | 2.68 | 2.28 | Y |
| Example 15 | 3–4 | 2.58 | 2.23 | Y |
| Example 16 | 4–5 | 0.51 | 0.39 | Y |

TABLE (II-1)-continued

| | Grade | GIE Lab (ΔE) | CMC (2:1) (ΔE) | On-Tone Fading |
|---|---|---|---|---|
| Example 17 | 4–5 | 0.75 | 0.60 | Y |
| Example 18 | 5 | 0.31 | 0.31 | Y |
| Example 19 | 4–5 | 0.50 | 0.38 | Y |
| Example 20 | 4–5 | 0.40 | 0.32 | Y |
| Example 21 | 4–5 | 0.65 | 0.53 | Y |
| Example 22 | 3–4 | 2.75 | 2.14 | Y |
| Example 23 | 3–4 | 2.65 | 2.13 | Y |
| Example 24 | 3–4 | 2.28 | 2.09 | Y |
| Example 25 | 3–4 | 2.55 | 2.26 | Y |
| Example 26 | 3–4 | 2.39 | 2.11 | Y |
| Example 27 | 4–5 | 1.27 | 0.96 | Y |
| Example 28 | 5 | 0.17 | 0.29 | Y |
| Example 29 | 5 | 0.14 | 0.30 | Y |
| Example 30 | 4–5 | 0.70 | 0.56 | Y |
| Example 31 | 3–4 | 2.27 | 2.06 | Y |

TABLE (I-2)

| | Component (b) | | | | component (c) |
|---|---|---|---|---|---|
| | Compound ratio | Compound ratio | Compound ratio | Compound ratio | Compound ratio |
| Comparative Example 1 | (V-1) 18% | (VI-1) 9% | — | — | (I) 73% |
| Comparative Example 2 | (V-3) 25% | — | — | — | (I) 75% |
| Comparative Example 3 | (V-3) 19% | (V-4) 21% | (VII-1) 3% | — | (I) 57% |
| Comparative Example 4 | (V-4) 22% | (VII-1) 3% | — | — | (I) 75% |
| Comparative Example 5 | (V-4) 18% | (VII-1) 3% | (VIII-2) 17% | (IX-2) 11% | (I) 51% |
| Comparative Example 6 | (VIII-2) 21% | (IX-2) 14% | | | (I) 65% |

TABLE (II-2)

| | Grade | GIE Lab (ΔE) | CMC (2:1) (ΔE) | On-Tone Fading |
|---|---|---|---|---|
| Comparative Example 1 | 3 | 3.61 | 2.78 | N |
| Comparative Example 2 | 3 | 4.88 | 3.31 | N |
| Comparative Example 3 | 3 | 3.16 | 2.95 | N |
| Comparative Example 4 | 2–3 | 4.33 | 3.21 | N |
| Comparative Example 5 | 3 | 3.19 | 2.80 | N |
| Comparative Example 6 | 3 | 4.94 | 3.15 | N |

The black dye composition of the present invention can be widely applied to dyeing a greater range of spinning and weaving products that contain a hydroxyl group or an amide group. The composition of the present invention can be used in traditional dyeing methods, for example, exhausting, printing, or continuous dyeing.

For cellulose fiber, the black dye composition of the present invention is a dye composition of great industrial value. Dyed material has good property in build-up, wash fastness, wash-off, and levelness, especially performing excellently in the properties of good color fastness to laundering-oxidative bleach response.

From the foregoing description, one skilled in the art can easily ascertain the essential characteristics of this invention, and, without departing from the scope thereof, can make various changes and modifications of the invention to adapt it to various usages and conditions. Thus, other embodiments are also within the claims.

What is claimed is:

1. A reactive dye composition having good color fastness to laundering-oxidative bleach response which comprises:

(a) at least a black or navy reactive dye with a good color fastness to laundering-oxidative bleach response, said black or navy reactive dye is selected from the group consisting of formula (III)

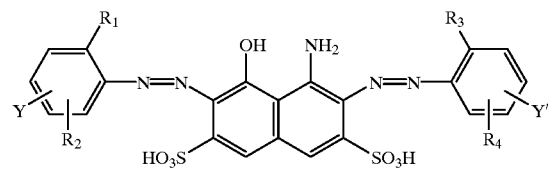

(III)

wherein Y and Y', each independent is —SO$_2$X, X is —OH, —CH=CH$_2$, —C$_2$H$_4$OSO$_3$H, or —C$_2$H$_4$Cl, R$_1$, R$_2$, R$_3$ and R$_4$, each independent, is hydrogen, halogen hydroxyl, C$_1$–C$_4$ alkyl C$_1$–C$_4$ alkoxyl, or sulfonyl groups, and at least one of R$_1$, R$_2$, R$_3$ and R$_4$, is other than hydrogen, or formula (IV).

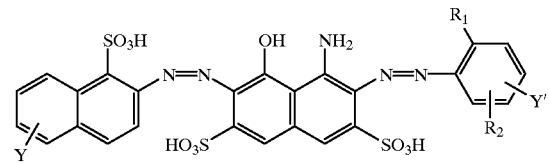

(IV)

wherein Y, Y', R$_1$ and R$_2$ are defined as the above; and (b) at least a red, orange, yellow or other shade of reactive azo dye, said red, orange, yellow or other shade of reactive azo dye is selected from the group consisting of formula (V), formula (VI), formula (VII), formula (VIII) and formula (IX),

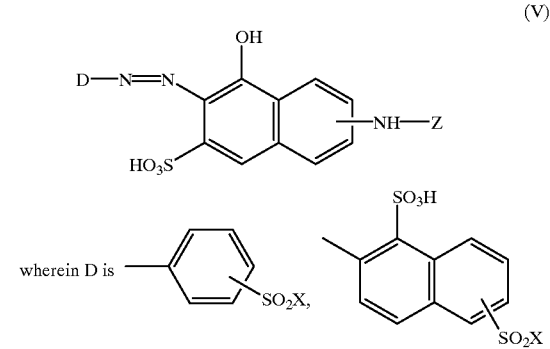

(V)

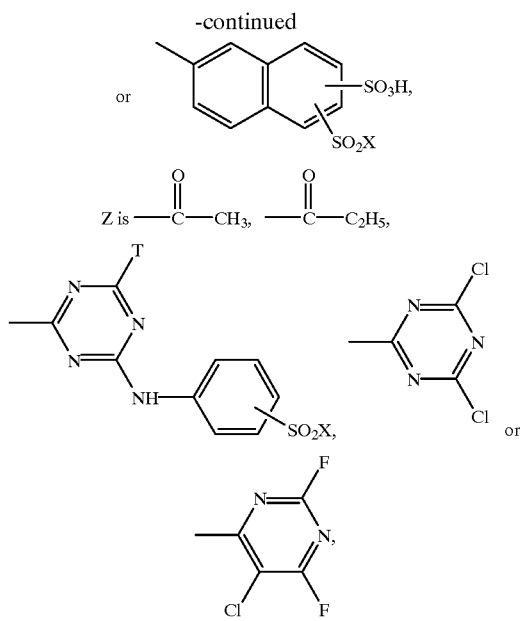

X and T are defined as the above,

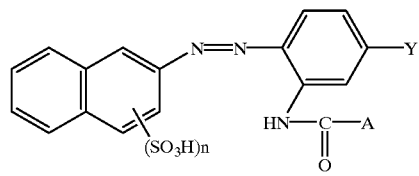

wherein Y is defined as the above, n is 1, 2, or 3, A is —OH,

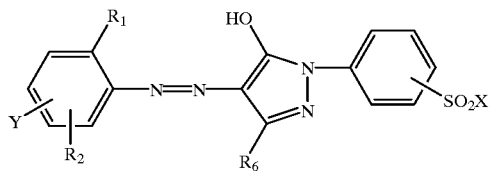

wherein X, Y, $R_1$, and $R_2$ are defined as the above, $R_6$ is —$CO_2H$, —$NH_2$ or —$CH_3$,

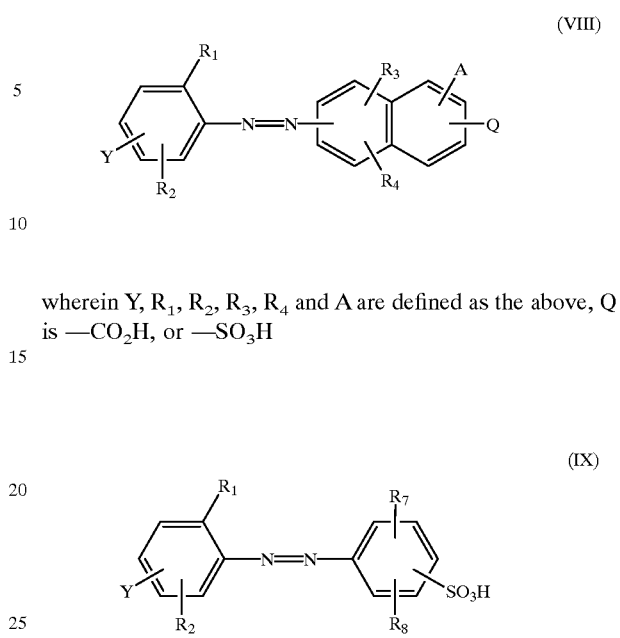

wherein Y, $R_1$, $R_2$, $R_3$, $R_4$ and A are defined as the above, Q is —$CO_2H$, or —$SO_3H$ wherein Y, $R_1$, and $R_2$ are defined as the above, $R_7$ and $R_8$ each independent is hydrogen, $C_1$–$C_4$ alkyl, amino or amino derivatives.

2. The composition of claim 1, wherein said black or navy reactive dye of component (a) is selected from the formula (III).

3. The composition of claim 1, wherein said black or deep navy reactive dye of component (a) is selected from the formula (IV).

4. The composition of claim 2, wherein said formula (III) is the following formula (III-1).

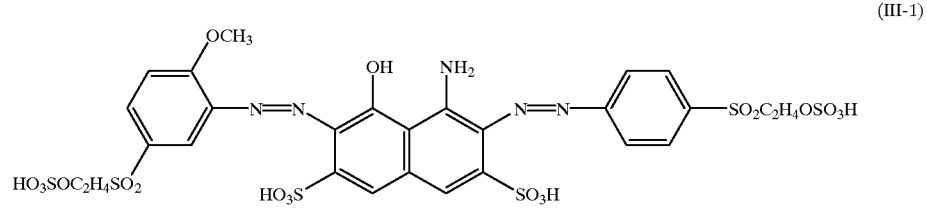

5. The composition of claim 3, wherein said formula (III) is the following formula (III-2).

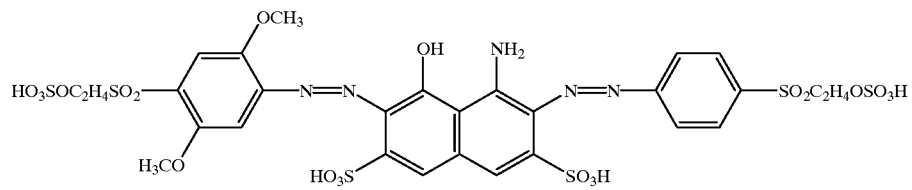

6. The composition of claim 1, wherein said formula (V) is the following formula (V-3).

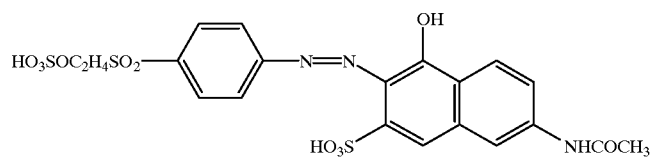

7. The composition of claim 1, wherein said formula (VIII) is the following formula (VIII-2).

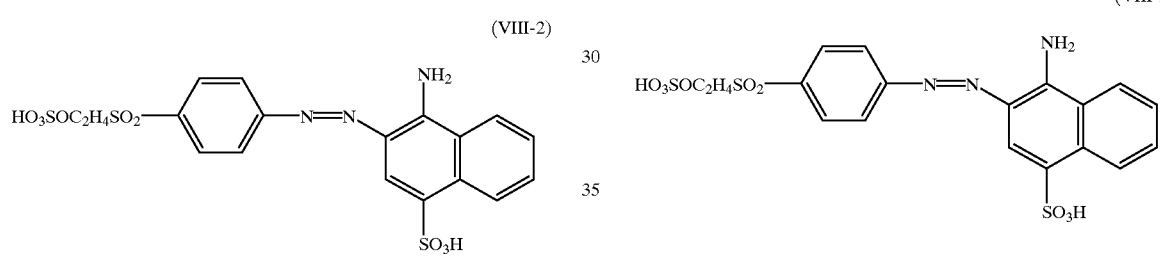

8. The composition of claim 1, wherein said formula (IX) is the following formula (IX-2).

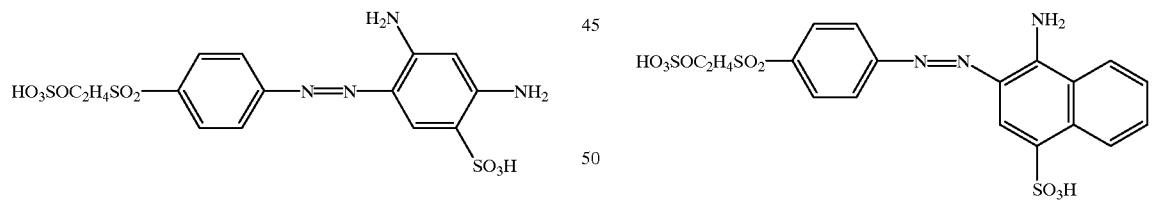

9. The composition of claim 4 comprising formula (III-1) 10% to 95% by weight, formula (V-3)

3% to 40% by weight, and formula (VIII-2)

3% to 40% by weight.

10. The composition of claim 4 comprising formula (III-1) 10% to 95% by weight and formula (VIII-2)

3% to 40% by weight.

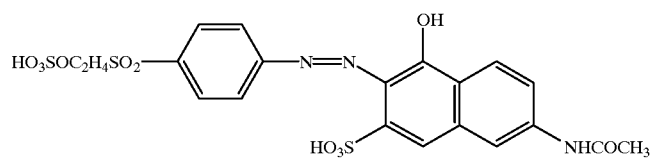

11. The composition of claim 4 comprising formula (III-1) 10% to 95% by weight, formula (VIII-2)

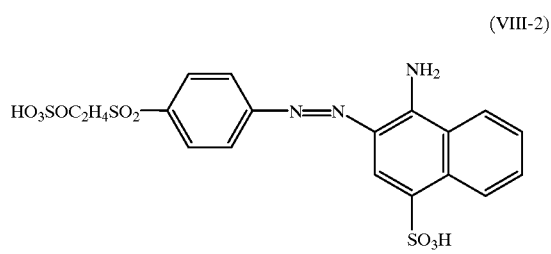

(VIII-2)

3% to 40% by weight, and formula (IX-2)

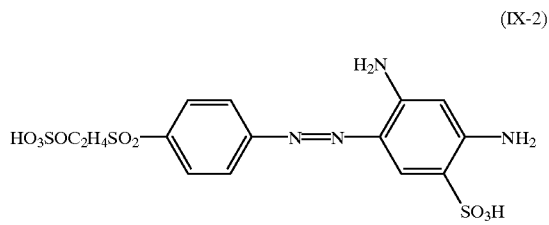

(IX-2)

3% to 40% by weight.

12. The composition of claim 5 comprising formula (III-2) 10% to 95% by weight, formula (V-3)

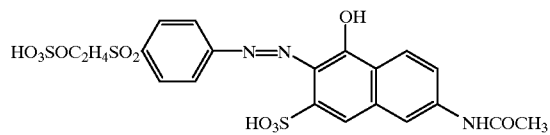

(V-3)

3% to 40% by weight, and formula (VIII-2)

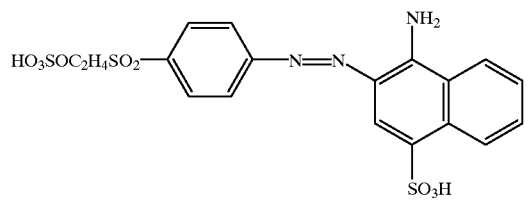

(VIII-2)

3% to 40% by weight.

13. The composition of claim 5 comprising formula (III-2) 10% to 95% by weight and formula (VIII-2)

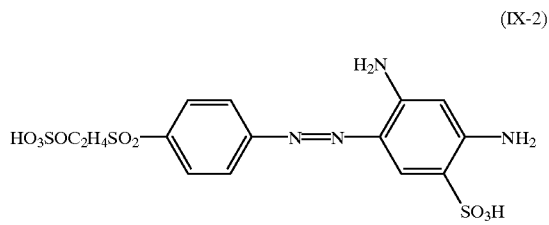

(VIII-2)

3% to 40% by weight.

14. The composition of claim 5 comprising formula (III-2) 10% to 95% by weight, formula (VIII-2)

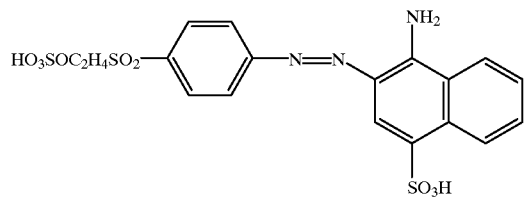

(VIII-2)

3% to 40% by weight, and formula (IX-2) 3% to 40% by weight.

* * * * *

UNITED STATES PATENT AND TRADEMARK OFFICE
CERTIFICATE OF CORRECTION

PATENT NO.   : 6,171,349 B1
DATED        : January 9, 2001
INVENTOR(S)  : Lai et al.

It is certified that error appears in the above-identified patent and that said Letters Patent is hereby corrected as shown below:

<u>Column 31,</u>
Lines 26 and 27, please delete the text and add the following:

X is defined as above,
T is -NHCN, -F or -CI,

Line 38, please replace the text with the following:

-- wherein Y is defined as the above, n is 1, 2, or 3, A is -OH, -NH$_2$, or -CH$_3$, --

Signed and Sealed this

Twenty-ninth Day of April, 2003

JAMES E. ROGAN
*Director of the United States Patent and Trademark Office*